June 13, 1939.   G. P. LIVINGSTON   2,162,623
MOUSE AND RAT TRAP
Filed Nov. 7, 1938   3 Sheets-Sheet 1

Inventor
G. P. Livingston
By Clarence A. O'Brien
Attorney

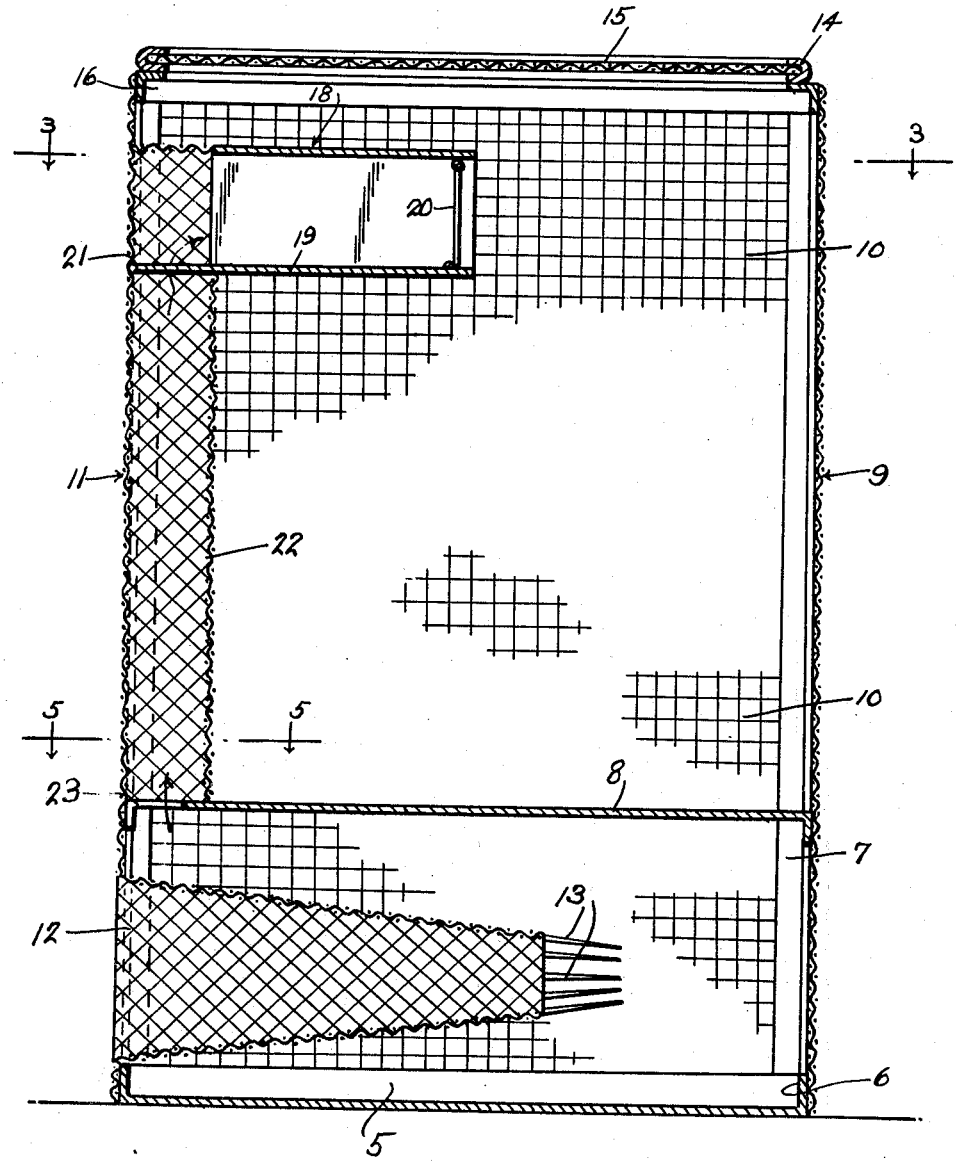

June 13, 1939.  G. P. LIVINGSTON  2,162,623
MOUSE AND RAT TRAP
Filed Nov. 7, 1938   3 Sheets-Sheet 3
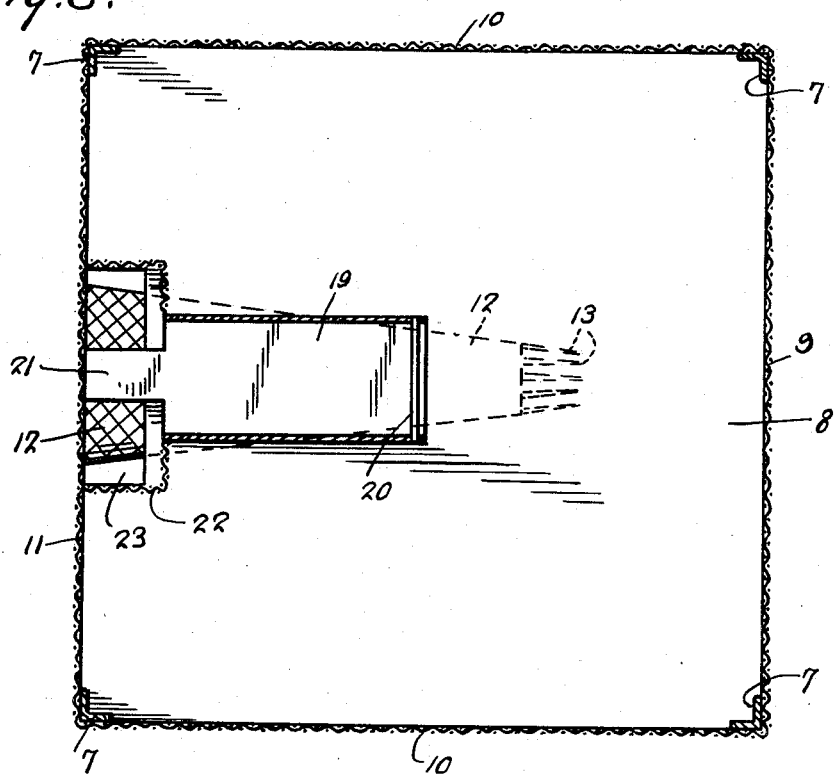
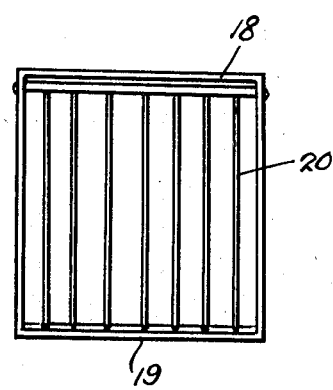
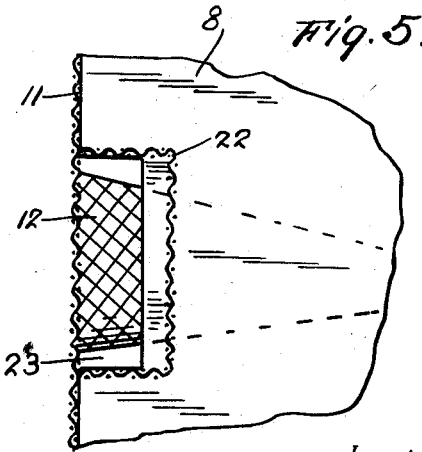
Inventor
G. P. Livingston
By Clarence A. O'Brien
Attorney Patented June 13, 1939

2,162,623

UNITED STATES PATENT OFFICE 2,162,623

MOUSE AND RAT TRAP

George P. Livingston, Quincy, Fla.

Application November 7, 1938, Serial No. 239,358

3 Claims. (Cl. 43—65)

This invention relates to improvements in traps for rodents and more particularly to a trap for effectively catching rats and mice.

The principal object of the present invention is to provide a trap which is not dangerous to humans and is capable of catching rats and mice in considerable quantities without any necessity for resetting.

Another object of the invention is to provide a rat and mouse trap wherein the caught rodents to a considerable degree serve to attract additional creatures of this variety instead of repelling the same, as in a trap where the caught rodent is pinned down or killed.

This invention also consists in certain other features of construction and in the combination and arrangement of the several parts, to be hereinafter fully described, illustrated in the accompanying drawings and specifically pointed out in the appended claims.

In describing the invention in detail, reference will be had to the accompanying drawings wherein like characters denote like or corresponding parts throughout the several views, and in which:

Figure 2 is a vertical sectional view taken through the trap.

Figure 3 is a horizontal sectional view taken substantially on line 3—3 of Figure 2, looking in the direction of the arrows.

Figure 4 is an end elevational view of the elevated tunnel.

Figure 5 is a fragmentary sectional view taken approximately on line 5—5 of Figure 2, looking in the direction of the arrows.

Figure 1:
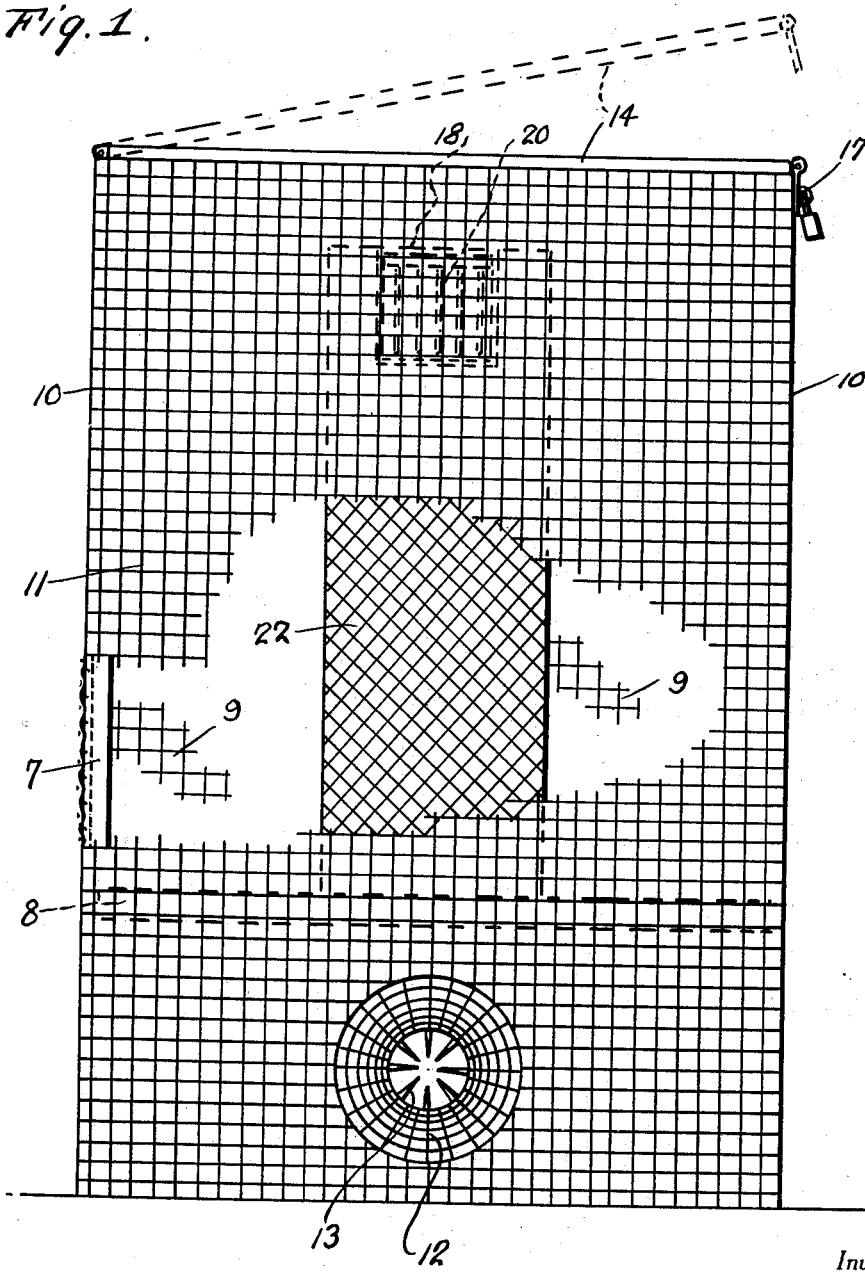
Figure 1 is a front elevational view of the trap which forms the subject matter of the present invention with a portion of the front wall broken away.

Referring to the drawings in detail, it will be seen that my trap includes an enclosure constructed of wire mesh and a frame work therefor that consists of a base 5 flanged upwardly as at 6, with corner posts 7 rising from the base and which serve to support an elevated floor 8 a considerable distance above the base, as best shown in Figure 2. The wire mesh is shaped about the frame work to provide the back wall 9, the side walls 10 and the front wall 11, and all of the walls are suitably secured to the posts 7.

The front wall 11 is provided with an opening therein below the floor 8, which has mounted therein the enlarged end of the conical shaped mesh tunnel 12 which extends inwardly within the enclosure below the floor 8 and is provided with a plurality of prongs 13 at the inner end thereof to prevent the return of a rodent after it has passed through the tunnel and entered the chamber above the base 5.

At the top of the enclosure is a cover made up of a frame 14 and the mesh filler 15. The cover is hingedly connected to the super-frame 16 supported by the corner posts 7 and suitable fastening means 17 is provided for securing the cover in closed position, as will be apparent upon inspection of Figure 1.

Arranged horizontally within the enclosure in juxtaposition with respect to the top thereof is a tunnel 18 that extends inwardly from the front wall 11, with its front end closed by the front wall as best shown in Figure 1.

The tunnel 18 which is preferably constructed of sheet metal into substantially rectangular formation, as shown, includes a floor 19 and this tunnel has its exit end normally closed by a gate 20 made up of a plurality of prongs, the gate being swingably mounted from the top wall of the tunnel for free movement outwardly with respect to the exit but is held against movement in an opposite direction from its normal closed position to prevent the return of a rodent after passing through the exit of the tunnel 18, as will be apparent upon inspection of Figure 2.

The floor 19 extends forwardly from the entrance end of the tunnel 18 into a narrow extension 21 providing a landing upon which the rodents can climb after ascending the mesh chute 22 which leads upwardly from a point adjacent the opening 23 in the floor 8 to the entrance end of the tunnel 18, as clearly shown in Figure 2.

From the above description and disclosure of the drawings, it will be obvious that when a rodent passes into and through the entrance tunnel 12 and enters the chamber below the floor 8, its tendency is to ascend to get to bait deposited on the floor 8, it therefore leaves the entrance chamber and crawls up the chute 22 and through the elevated tunnel 18 to the bait chamber within which it is trapped as it cannot return, due to the fact that the gate 20 is held against opening toward the entrance end of the tunnel 18.

It is thought from the foregoing description that the advantages and novel features of the invention will be readily apparent.

It is to be understood that changes may be made in the construction and in the combination and arrangement of the several parts, provided that such changes fall within the scope of the appended claims.

What I claim is:

1. A rodent trap comprising an enclosure, a substantially conical entrance tunnel extending within the enclosure and having its apex end open and innermost, a floor above the entrance tunnel and having an opening therein, an elevated tunnel in the enclosure, and a chute extending upwardly from adjacent the opening in the floor to the elevated tunnel.

2. A rodent trap comprising an enclosure, a substantially conical entrance tunnel extending within the enclosure and having its apex end open and innermost, a floor above the entrance tunnel and having an opening therein, an elevated tunnel in the enclosure, a chute extending upwardly from adjacent the opening in the floor to the elevated tunnel, and a swingable gate at the exit end of the elevated tunnel.

3. A rodent trap comprising an enclosure, a substantially conical entrance tunnel extending within the enclosure and having its apex end open and innermost, a floor above the entrance tunnel and having an opening therein, an elevated tunnel in the enclosure, a chute extending upwardly from adjacent the opening in the floor to the elevated tunnel, a narrow extension included in the floor of the elevated tunnel and bridging the chute at its juncture with the elevated tunnel to provide a rodent receiving landing, and prongs extending from the apex end of the entrance tunnel in surrounding relation with respect thereto.

GEORGE P. LIVINGSTON.